(12) United States Patent
Hedberg

(10) Patent No.: US 7,441,992 B2
(45) Date of Patent: Oct. 28, 2008

(54) METHOD FOR PRODUCING A SURFACE, AND A SURFACE

(75) Inventor: Stefan Hedberg, Hedemora (SE)

(73) Assignee: Seco Tools AB, Fagersta (SE)

( * ) Notice: Subject to any disclaimer, the term of this patent is extended or adjusted under 35 U.S.C. 154(b) by 227 days.

(21) Appl. No.: 10/906,607

(22) Filed: Feb. 25, 2005

(65) Prior Publication Data
US 2005/0196245 A1 Sep. 8, 2005

(30) Foreign Application Priority Data
Mar. 4, 2004 (SE) .................................... 0400530

(51) Int. Cl.
*B23B 51/00* (2006.01)
*B23B 27/16* (2006.01)

(52) U.S. Cl. .................. 407/103; 407/113; 407/115

(58) Field of Classification Search ................. 409/132, 409/232; 407/101, 66, 67, 113, 103, 104, 407/114–116
See application file for complete search history.

(56) References Cited

U.S. PATENT DOCUMENTS

| | | | | |
|---|---|---|---|---|
| 4,655,655 A | * | 4/1987 | Schurfeld | 409/232 |
| 4,820,091 A | * | 4/1989 | Koski | 409/132 |
| 4,883,392 A | * | 11/1989 | Lieser | 409/165 |
| 6,146,060 A | * | 11/2000 | Rydberg et al. | 407/40 |
| 7,001,114 B2 | * | 2/2006 | Blucher et al. | 407/103 |

* cited by examiner

*Primary Examiner*—Willmon Fridie
(74) *Attorney, Agent, or Firm*—WRB-IP LLP

(57) ABSTRACT

In a method for producing a surface that is intended to form part of a coupling for use in chip removing machining, the surface includes a number of groove sets to allow locking by shape against another surface provided with grooves. Each groove set has a main direction, and the main directions of adjacently situated groove sets intersect. The number of groove sets are at least three, each groove set is produced in a separate cutting operation, and an equally large part of the surface is machined during each cutting operation. A surface that is intended to form part of a coupling for use in chip removing machining is also disclosed.

14 Claims, 4 Drawing Sheets

METHOD FOR PRODUCING A SURFACE, AND A SURFACE

The present application claims priority to SE 0400530-2, filed Mar. 4, 2004, and which is incorporated by reference.

BACKGROUND

The present invention relates to a method for producing a surface which is intended to be comprised in a coupling for use in chip removing machining, wherein the surface is profiled with grooves to allow locking by shape against another surface provided with grooves, wherein the first mentioned surface comprises a number of groove sets, wherein each groove set has a main direction, wherein the main directions of adjacent groove sets intersect. The invention also relates to a surface, per se, that is produced by means of the method according to the present invention.

A method for producing a surface of the kind defined above is previously known through U.S. Pat. No. 6,146,060, wherein the groove sets are made by hobbing or grinding having the feed direction parallel with the main direction of the current groove set. A first groove set is made through hobbing or grinding, wherein this first groove set generally covers half of the surface comprised in the coupling. Subsequently, a second groove set is made by means of hobbing or grinding, wherein the tool being used to provide hobbing or grinding is fed into a short piece into the first groove set. Thereby, is made certain that the grooves that are comprised in the second set obtain full depth along its entire length. However, all the grooves comprised in a set have proven not to have the same depth, wherein the difference is especially large when it comes to the grooves in a set that are situated furthest away from each other. The reason for this is that the rotary tool performing hobbing or grinding is normally only supported at one end, i.e. the tool has one free end. This leads to so called tool deflection, which in turn results in that the grooves generated at the area of the tool's free end becomes more shallow than the grooves generated by the section of the tool situated closer to the support of the tool.

OBJECTS AND FEATURES OF THE INVENTION

One object of the present invention is to provide a method that compensates for the tool deflection of the used tool.

Another object of the present invention is that the positional errors between the tool and the blank being machined shall compensate each other.

Still another object of the present invention is to control the positions of the abutment locations between the cooperating surfaces that are produced by means of the method according to the present invention.

The objects of the present invention are realized by means of a method and a surface having obtained the indicated features in the independent claims. Preferred embodiments of the invention are defined in the dependent claims.

BRIEF DESCRIPTION OF THE DRAWINGS

Below an example of prior art as well as an embodiment according to the invention will be described with reference to appended drawings, wherein.

DETAILED DESCRIPTION

Figure 4:
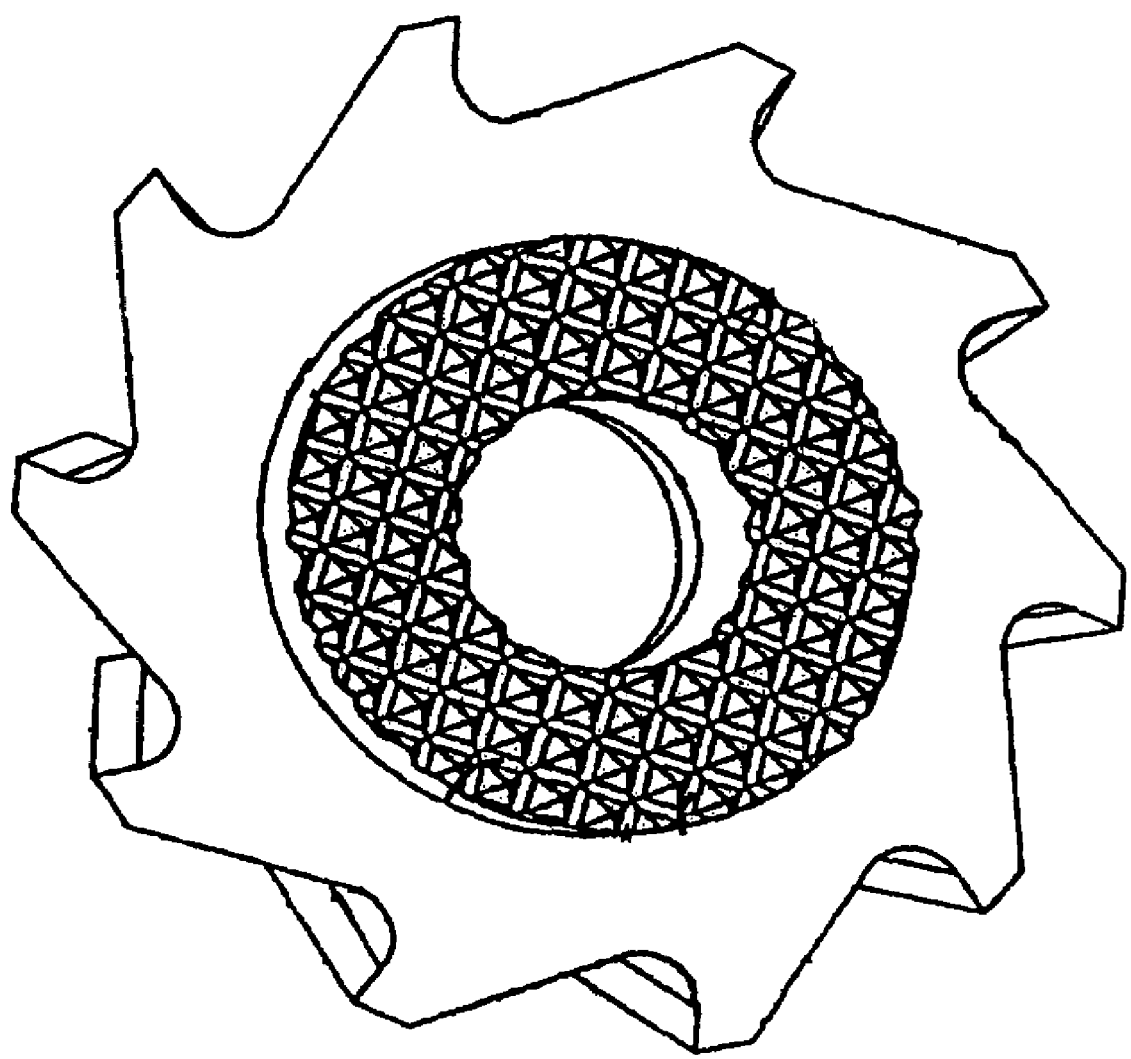
FIG. 4 shows a perspective view of a cutting head that is described in U.S. Pat. No. 6,146,060.

In FIG. 4 is shown a perspective view of a cutting head comprised in a tool according to U.S. Pat. No. 6,146,060, wherein the cutting head is provided with a surface profiled with grooves to allow locking by shape against that surface in U.S. Pat. No. 6,146,060 described above. At the surface according to FIG. 4 both the groove sets completely intersects at a right angle, wherein a number of "pyramids" are formed. The surface according to FIG. 4 is normally produced by means of grinding or injection molding.

Figure 1:
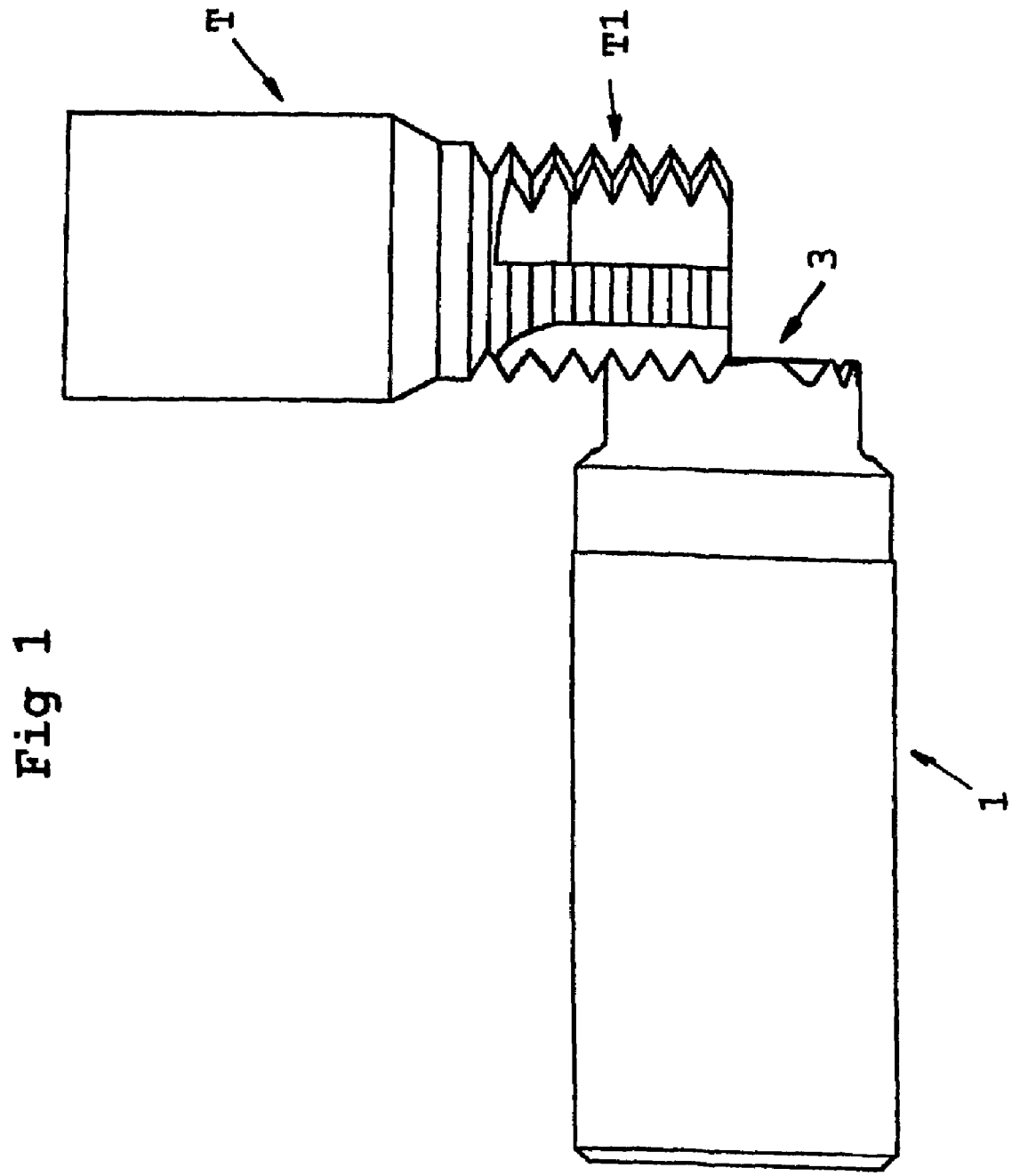
FIG. 1 schematically shows how a tool performs machining to provide a surface intended to be comprised in a coupling in tools for chip removing machining.
Figure 2:
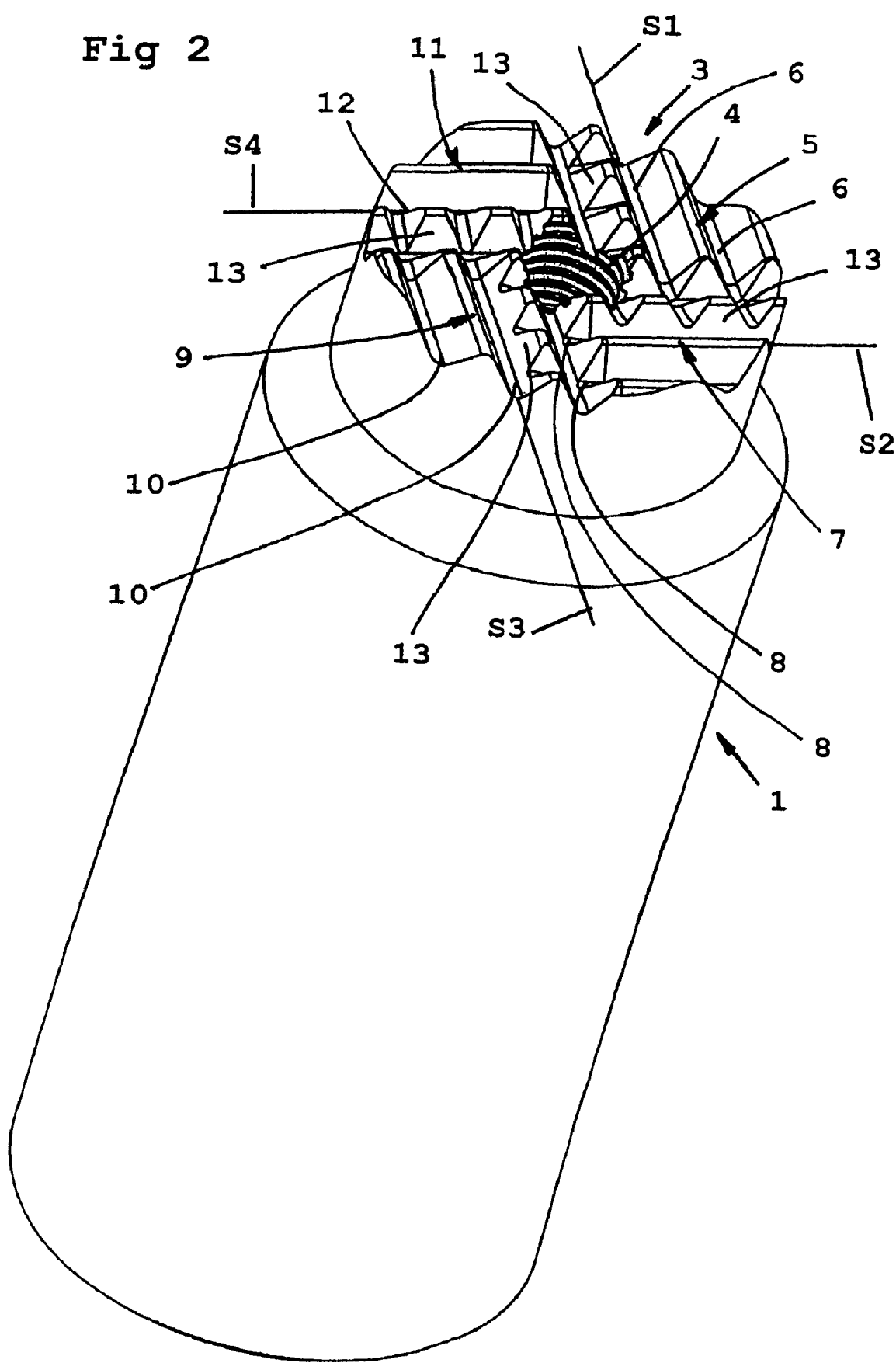
FIG. 2 shows a perspective view of a surface intended to be comprised in a coupling in tools for chip removing machining.

In FIG. 1 is schematically shown how a tool T, preferably an end mill, machines an end surface 3 of a holder 1, which is intended for coupling with a tool head (not shown) to form a tool for chip removing machining. The holder 1 has a through-going center hole 4, as illustrated by FIG. 2. The holder 1 may be produced of steel or high speed steel, i.e. a material capable of being machined by means of chip removing machining.

Through simultaneous study of FIG. 1 and 2 is evident that the operative part T1 of the end mill T during a cutting operation generally machines a quadrant of the generally circular end surface 3. Consequently four separate cutting operations are required to achieve the end surface 3 shown in FIG. 2. A groove set 5, 7, 9 and 11 is generated during each cutting operation. The first groove set 5 comprises a number of first grooves or recesses 6, the second groove set 7 comprises a number of second grooves or recesses 8, the third groove set 9 comprises a number of third grooves or recesses 10, and the fourth groove set 11 comprises a number of fourth grooves or recesses 12. The first grooves 6 have a first main direction S1, the second grooves 8 have a second main direction S2, the third grooves 10 have a third main direction S3 and the fourth grooves 12 have a fourth main direction S4. The main directions S1 and S3 are parallel to each other and the main directions S2 and S4 are parallel to each other.

As shown in FIG. 2 adjacent grooves overlap each other to a certain extent. This is indicated by "pyramids" 13 being formed at the border area between two adjacent groove sets. The reason for an overlap occurring between adjacent groove sets is that the grooves shall have full depth within the quadrant defined by the set. The overlap is used to successively remove the operative part T1 of the end mill T from the end surface 3 of the work piece 1 until the operative part T1 of the end mill T no longer is in engagement with the work piece 1.

The end surface 3 shown in FIG. 2 is thus made by performing the schematically shown cutting operation in FIG. 1 four times, wherein each cutting operation in principle generates a quadrant, however the operative part T1 of the end mill T continues somewhat outside the quadrant, which has been discussed above. At the first cutting operation the operative part T1 of the end mill T consequently moves in the main direction S1, from the periphery of the end surface 3 and inwards, thereby generating a number of first grooves 6. Obviously the number of grooves corresponds to the number of active teeth on the operative part T1 of the end mill T. The cutting operation is now repeated three times further, wherein the operative part T1 of the end mill T in turns moves along the main directions S2, S3, and S4 relative to the work piece.

By providing grooves at in principle only one quadrant at a time the active width that the operative part T1 of the end mill T machines is relatively limited. This leads to that the deflection occurring at the free end of the end mill T becomes relatively smaller than if the end mill T had machined a larger width. This deflection leads to that the depth of the machined grooves does not become identical in one groove set. However, this deflection diminishes considerably at the method according to the present invention compared to prior art, thus consequently meaning that the depth of the grooves comprised in a groove set obtain a better accuracy.

Figure 3:
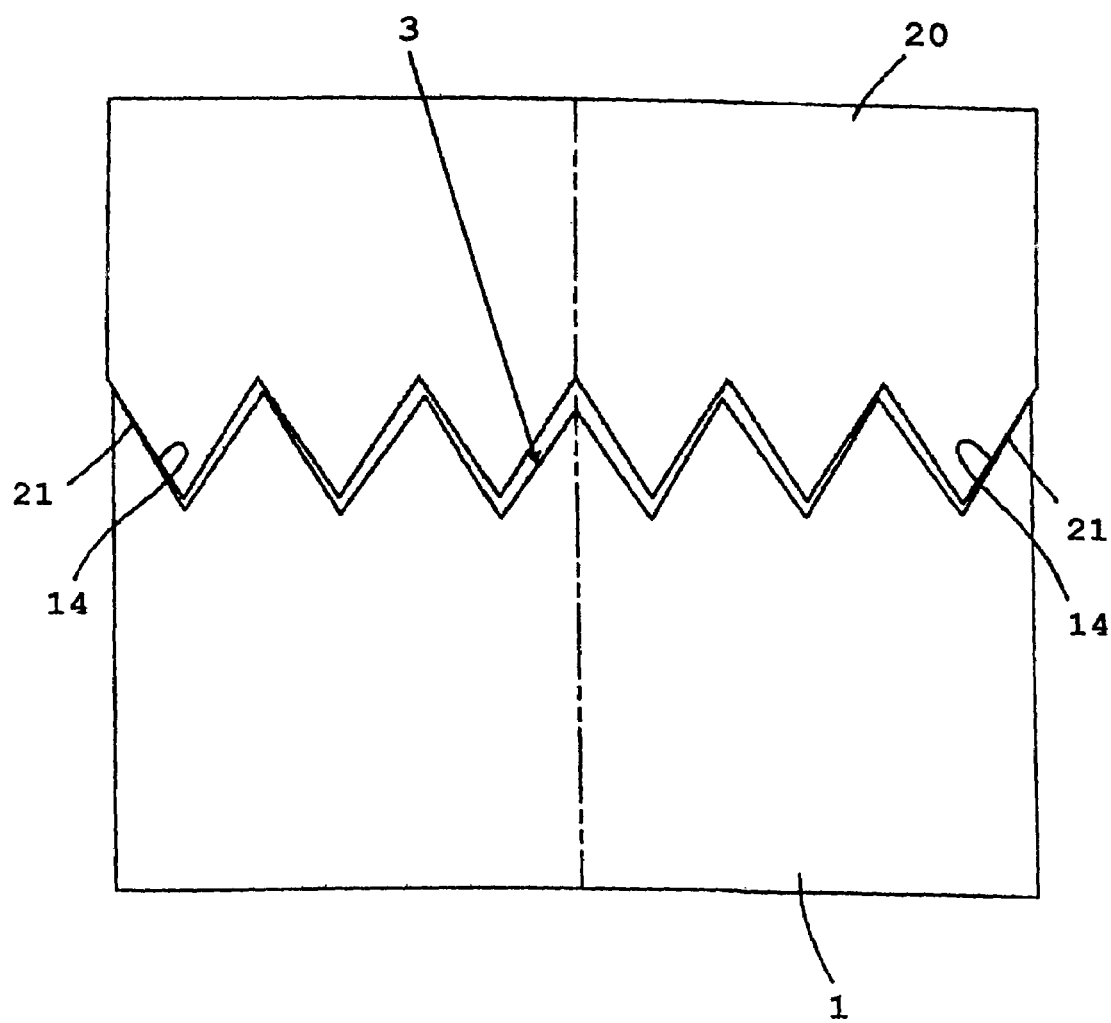
FIG. 3 shows a cross-section through two cooperating surfaces comprised in a coupling in a tool for chip removing machining.

In FIG. 3 is schematically shown abutment between two surfaces comprised in a coupling, wherein the lower surface 3 in FIG. 3 belongs to the holder 1, i.e. it is the surface machined by means of the method according to the present invention while the upper surface in FIG. 3 for example belongs to a cutting head 20 preferably produced in injection molded cemented carbide. The upper surface may in principle be of the same embodiment as the surface shown in FIG. 4, however the number of grooves is less for the upper surface according to FIG. 3. In association with this it shall be noted that during injection molding the above indicated problems with grooves obtaining different depths does not appear, this phenomena happens only when grooves are produced by means of chip removing machining. The cutting head 20 also has a center hole and the cutting head 20 is brought to abutment against the holder by means of a center screw received by both center holes.

From FIG. 3 is apparent that the pitch of the two surfaces abutting against each other is such that an abutment occurs in controlled abutment points, more exactly at the surface 3 an abutment on the flanks 14 that are facing towards the center of the coupling occurs. Thus, the groove sets of the holder become identical, i.e. the same tolerance fault is created in each groove set, which makes the change of the cutting head very accurate. By studying FIG. 3 is evident that at the surface, associated with the cutting head, abutment against the flanks 21 that are facing away from the center of the coupling occurs, i.e. compressive stress is applied to the cutting head 20 produced of cemented carbide, which is an advantage since cemented carbide generally has difficulties handling tensile stresses.

In the above described embodiment the holder 1 has a circular cross section, however within the limits of the present invention the cross section could also be square.

For example, there is also a possibility that the cross section is triangular, pentagonal, hexagonal or octagonal. If the cross section is triangular generally a third of the end surface is machined during each cutting operation, if the surface cross section is pentagonal generally a fifth of the work surface is machined during each cutting operation etc.

In the above described embodiment of the present invention an end mill T is used to carry out the chip removing machining. However one can within the limits of the invention also conceive that the groove sets are provided by grinding. For that reason the expression "material removing" is used in certain parts of the present patent application.

What is claimed is:

1. Method for producing a surface that is intended to be comprised in a coupling for use at chip removing machining, comprising:

forming at least three groove sets in a surface at an end of a cylindrical member for contacting another surface provided with grooves, wherein each groove set has a plurality of elongate grooves extending in a main direction, at least one groove of the plurality of grooves of each groove set having a length more than twice a width of the groove, and wherein main directions of adjacent groove sets intersect, each groove set being produced in a separate cutting operation;

during each cutting operation, machining an equal part of the surface; and during an end phase of at least one cutting operation, overlapping a groove set being produced with at least one adjacent groove set.

2. Method according to claim 1, comprising, during the end phase of at least one cutting operation, diminishing a groove depth in a groove set being machined.

3. Method for producing a surface that is intended to be comprised in a coupling for use at chip removing machining, comprising:

forming at least three groove sets in a surface at an end of a cylindrical member for contacting another surface provided with grooves, wherein each groove set has a plurality of elongate grooves extending in a main direction, at least one groove of the plurality of grooves of each groove set having a length more than twice a width of the groove, and wherein main directions of adjacent groove sets intersect, each groove set being produced in a separate culling operation;

during each cutting operation, machining an equal part of the surface; and during an end phase of at least one cutting operation, overlapping a groove set being produced with at least one adjacent groove set.

4. Method according to claim 3, comprising, during the end phase of at least one cutting operation, diminishing a groove depth in a groove set being machined.

5. Surface for use in a rotating tool for chip removing machining, comprising a surface having a center hole, at least three groove sets for contacting another surface provided with grooves, each groove set being adjacent at least two other groove sets of the at least three groove sets, wherein each groove set has a plurality of elongate grooves extending in a main direction, at least one groove of the plurality of grooves of each groove set having a length more than twice a width of the groove, and the main directions of adjacent groove sets intersect, adjacent groove sets overlap, and each groove set covers an equal part of the surface.

6. Surface according to claim 5, wherein, in an area where two of the at least three groove sets overlap, at least one of the two groove sets has a reduced depth.

7. Surface according to claim 6, wherein there are four groove sets, and every other groove set is parallel to every other groove set.

8. Surface according to claim 5, wherein there are four groove sets, and every other groove set is parallel to every other groove set.

9. Surface according to claim 5, wherein, in two groove sets defining an adjacent groove set, at least two grooves in each groove set define a plurality of generally pyramidal shapes.

10. Surface according to claim 9, wherein at least one groove of the two grooves of each groove set defining the plurality of generally pyramidal shapes is deeper than another groove of the two grooves of each groove set defining the plurality of generally pyramidal shapes.

11. Surface according to claim 5, wherein each groove in each groove set intersects a periphery of the surface in one place.

12. A cutting tool comprising a surface as set forth in claim 5 on an end of at least one of a holder and a cutting head of the cutting tool.

13. The cutting tool as set forth in claim 12, wherein the surface as set forth in claim 7 is provided on the holder, and another surface for mating with the surface and comprising a plurality of pyramidal shapes is provided on the cutting head.

14. The cutting tool as set forth in claim 12, wherein a complementary surface is provided on the other one of the holder and the cutting head for engaging with the surface, the surface and the complementary surface engaging such that a load on the cutting head is divided substantially equally among the at least three groove sets.

* * * * *